(12) United States Patent
Bueno De Camargo Mello et al.

(10) Patent No.: US 11,875,941 B2
(45) Date of Patent: Jan. 16, 2024

(54) CAPACITOR

(71) Applicant: TDK Electronics AG, Munich (DE)

(72) Inventors: Fabio Augusto Bueno De Camargo Mello, Munich (DE); Alessandro Girardi, Porto Alegre (BR); Moisés Coster, Munich (DE); Mozart Minuzzo, Gravataí (BR); Jean Cardoso Generoso, Gravataí (BR)

(73) Assignee: TDK Electronics AG, Munich (DE)

( * ) Notice: Subject to any disclaimer, the term of this patent is extended or adjusted under 35 U.S.C. 154(b) by 8 days.

(21) Appl. No.: 17/597,423

(22) PCT Filed: Jun. 17, 2020

(86) PCT No.: PCT/EP2020/066771
§ 371 (c)(1),
(2) Date: Jan. 5, 2022

(87) PCT Pub. No.: WO2021/008802
PCT Pub. Date: Jan. 21, 2021

(65) Prior Publication Data
US 2022/0262564 A1    Aug. 18, 2022

(30) Foreign Application Priority Data
Jul. 18, 2019 (DE) .................. 10 2019 119 538.1

(51) Int. Cl.
| | |
|---|---|
| *H01G 2/06* | (2006.01) |
| *H01G 2/08* | (2006.01) |
| *H01G 2/10* | (2006.01) |
| *H01G 4/32* | (2006.01) |

(52) U.S. Cl.
CPC ............... *H01G 2/065* (2013.01); *H01G 2/08* (2013.01); *H01G 2/106* (2013.01); *H01G 4/32* (2013.01)

(58) Field of Classification Search
CPC .......... H01G 2/065; H01G 2/08; H01G 2/106; H01G 4/32
USPC ................ 361/301.4, 306.1, 301.5, 308.2
See application file for complete search history.

(56) References Cited

U.S. PATENT DOCUMENTS

| | | | | |
|---|---|---|---|---|
| 3,670,210 | A * | 6/1972 | Blase | H01G 2/08 361/514 |
| 5,838,532 | A * | 11/1998 | Nakata | H01G 9/00 361/535 |
| 6,356,431 | B1 | 3/2002 | Lin et al. | |
| 6,430,024 | B1 * | 8/2002 | Gernert | H01G 2/08 361/535 |
| 7,233,485 | B2 | 6/2007 | Fujimoto et al. | |
| 7,532,484 | B1 * | 5/2009 | Sailor | H05K 3/325 361/773 |

(Continued)

FOREIGN PATENT DOCUMENTS

| | | |
|---|---|---|
| CN | 1592569 A | 3/2005 |
| CN | 1822266 A | 8/2006 |

(Continued)

*Primary Examiner* — Arun Ramaswamy
(74) *Attorney, Agent, or Firm* — Slater Matsil, LLP (57) ABSTRACT

In an embodiment a capacitor includes a winding element arranged in a case, a mounting plate which has a non-conductive material and which is fixed to the case and a metal element arranged between the case and the mounting plate, wherein the metal element includes a protruding part protruding through the mounting plate.

20 Claims, 5 Drawing Sheets

(56) References Cited

U.S. PATENT DOCUMENTS

| | | | |
|---|---|---|---|
| 2003/0117765 A1* | 6/2003 | Sagal | H01G 2/08 361/302 |
| 2008/0117567 A1 | 5/2008 | Nakamura et al. | |
| 2010/0267252 A1 | 10/2010 | Fujimoto | |
| 2012/0019985 A1 | 1/2012 | Chan et al. | |
| 2012/0081835 A1 | 4/2012 | Shimizu et al. | |
| 2018/0263121 A1 | 9/2018 | Tadele et al. | |

FOREIGN PATENT DOCUMENTS

| | | | |
|---|---|---|---|
| CN | 102122570 A | 7/2011 | |
| CN | 207852485 U | 9/2018 | |
| CN | 208478137 U | 2/2019 | |
| DE | 102008049189 A1 | 4/2010 | |
| JP | S5761827 A | 4/1982 | |
| JP | H0557811 U | 7/1993 | |
| JP | H1032137 A | 2/1998 | |
| JP | H11354382 A | 12/1999 | |
| JP | 3497242 B2 | 2/2004 | |
| JP | 2004349363 A | 12/2004 | |
| JP | 5413586 B2 * | 2/2014 | H01G 4/32 |
| JP | 2015213137 A | 11/2015 | |

\* cited by examiner

CAPACITOR

This patent application is a national phase filing under section 371 of PCT/EP2020/066771, filed Jun. 17, 2020, which claims the priority of German patent application 102019119538.1, filed Jul. 18, 2019, each of which is incorporated herein by reference in its entirety.

TECHNICAL FIELD

The present invention concerns a capacitor. In particular, the present invention concerns a capacitor which is configured to be mounted to a printed circuit board (PCB) by surface mounting (SMD).

BACKGROUND

Standard SMD capacitors often have a poor mechanical fixation to a PCB through their band wires. Moreover, thermal dissipation from the SMD capacitor to the PCB is limited by the physical dimensions of the wires.

SUMMARY OF THE INVENTION

Embodiments provide an improved capacitor designed for surface mounting which overcomes at least one of the above-discussed disadvantages. Further embodiments provide such a capacitor.

A capacitor is provided which comprises a winding element arranged in a case, a mounting plate which comprises a non-conductive material and which is fixed to the case, and a metal element which is arranged between the case and the mounting plate, wherein the metal element comprises a protruding part which protrudes through the mounting plate. The capacitor can additionally comprise a sealing element.

By adding the metal element between the case of the capacitor and the mounting plate, the above-discussed disadvantages of SMD capacitors can be overcome. The metal element can be thermally contacted to the case. Thus, during surface mounting, for example by reflow soldering, heat collected by the case can be transferred via the metal element to a PCB. Thus, heat can be applied to solder pads of the PCB during the reflow soldering very fast, thereby accelerating the soldering process as the heat can not only be applied via the PCB itself, but also heat collected by the case can be applied to the solder pads. Moreover, during normal operation of the capacitor, the metal element can remain thermally connected to the case such that heat generated by the winding element inside the case can be transferred by the metal element to the printed circuit board. Thus, the addition of the metal element can allow to use the printed circuit board as a heatsink. For example, ripple currents may generate heat in the winding element. The metal element can contribute to a thermal management of the capacitor by transferring heat away from the case.

The metal element can also contribute to an improved mechanical fixation of the capacitor to the printed circuit board. In particular, the metal element can provide one or more mechanical contacts which can be fixed to the printed circuit board, for example by soldering.

The mounting plate can be a small plate which has lateral dimensions that are similar to the lateral dimensions of the case. The case can be fixed to the mounting plate. The mounting plate can be designed to be fixed to a printed circuit board during surface mounting.

The protruding part of the metal element may extend in a direction away from the winding element over the mounting plate.

The protruding part of the metal element can be configured to be fixed to a printed circuit board when the capacitor is surface mounted to the PCB. In particular, the protruding part of the metal element can form a mechanical contact which can be fixed to a solder pad of the PCB by soldering.

The metal element can be configured to transfer heat from the case to the PCB. Thus, the metal element can accelerate the soldering process during surface mounting as heat connected by the case is effectively transferred to the solder pad. Moreover, during normal operation of the capacitor, the metal element can enable to transfer heat from the case to the PCB such that the PCB can be used as a heatsink.

The winding element can comprise two terminals which form two contacts configured to be fixed to the PCB during surface mounting. The two terminals of the winding element can provide an electrical contact of the winding element to the PCB. Additionally, the two terminals of the winding element can also be thermally and mechanically connected to the PCB.

The metal element can provide two additional mechanical contacts configured to be fixed during surface mounting. Said additional mechanical contacts can be formed by the protruding part of the metal element. The contacts provided by the metal element are preferably not galvanic connected to the winding element. The contacts provided by the metal element can be mechanically and thermally connected to the PCB. Thus, the metal element can contribute to a better mechanical and thermal connection of the PCB and the capacitor.

The terminals of the winding element can protrude through a recess in the mounting plate.

The metal element can be clamped between the mounting plate and the case. The metal element can be fixed to the case purely mechanically. In particular, no glue and no external plastic parts are required for fixing the metal element to the case. Instead, the metal element can be fixed to the case by the same mechanical means which also fixes a sealing element closing the case to the remainder of the case. In particular, the metal element can be fixed to the case by a crimp and a curling. The crimp and the curling are required anyway for closing the case with the sealing element such that no additional means are required for fixing the metal element. The metal element can be arranged between the sealing element and the mounting plate. In particular, the metal element can abut the sealing element arranged at the lower end of the case. The metal element also abuts the mounting plate.

The metal element can comprise a ring-shaped base body. The ring shape of the base body can define an opening wherein the terminals of the winding element can pass through the opening. The opening in the base body can be large enough to allow a combination of the ring-shaped base body with a large variety of winding elements and sealing elements wherein the position and the size of the terminals is not limited by the opening in the metal element.

The protruding part of the metal element can be a pin. The pin can be bent before or after being passed through an opening in the mounting plate. By bending the pin, the metal element can additionally be fixed to the mounting plate such that movements of the metal element in the axial direction relative to the mounting plate are prevented.

The pin can be bent such that it forms a surface parallel to a mounting surface of the capacitor. The mounting surface of the capacitor can be a lower surface of the mounting plate pointing away from the winding element. The mounting surface of the capacitor can be designed to about a PCB when the capacitor is surface mounted to the PCB.

The metal element can be a stamped metal sheet wherein the protruding part is formed by stamping.

The metal element is preferably not galvanic connected to the winding element.

The capacitor may comprise a sealing element which seals the case. The metal element may be arranged between the sealing element and the mounting plate.

Yet other embodiments provide an arrangement which comprises a PCB and the above-described capacitor wherein the capacitor is fixed to the PCB by surface mounting.

BRIEF DESCRIPTION OF THE DRAWINGS

The following, preferred embodiments of the present invention are described with respect to the drawings.

DETAILED DESCRIPTION OF ILLUSTRATIVE EMBODIMENTS

Figure 1:
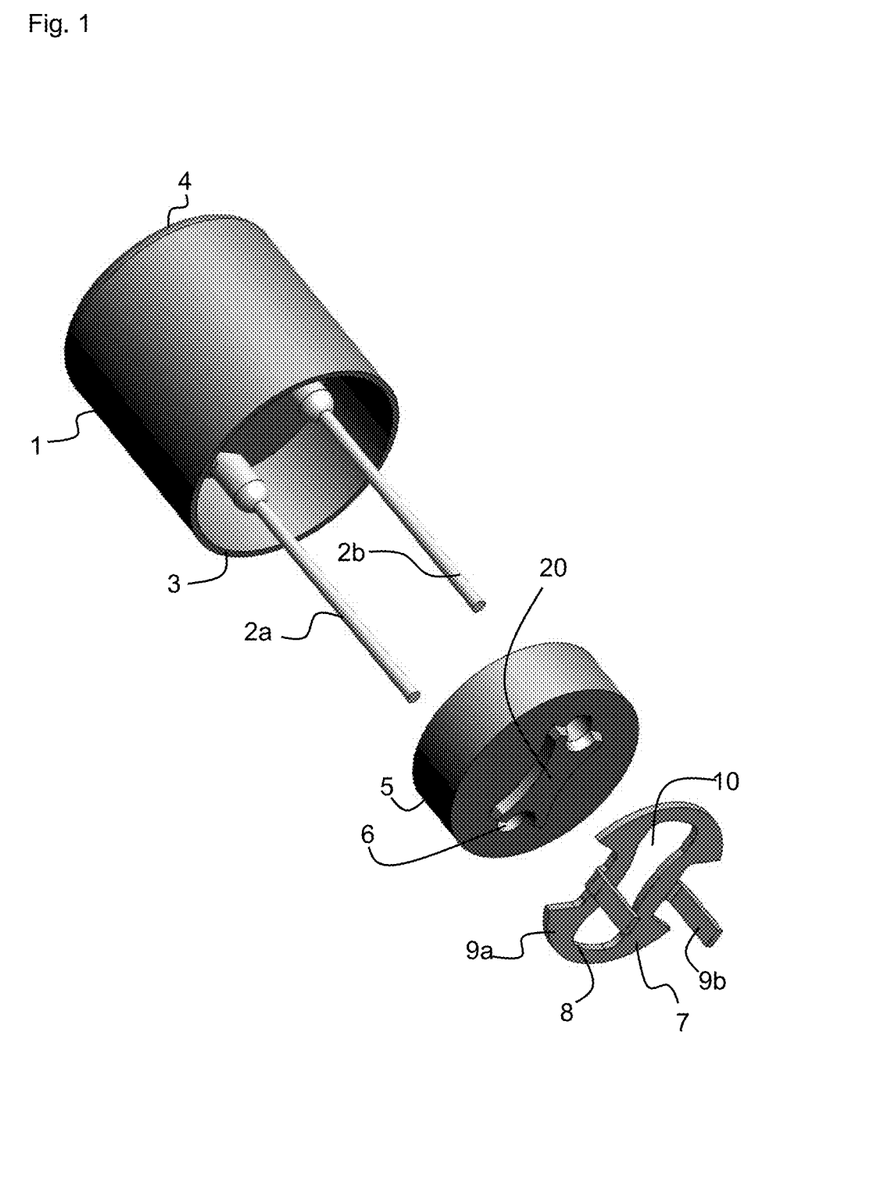
FIG. 1 shows a case, a sealing element and a metal element of a capacitor in an exploded view.

FIG. 1 shows a case 1, a sealing element 5 and a metal element 7 of capacitor in an exploded view.

The capacitor comprises a winding element arranged inside the case 1. The case 1 is an aluminium can. The case 1 is cylindrical. The winding element comprises two terminals 2a, 2b which project out of the case 1. The terminals 2a, 2b of the winding element are electrical terminals configured to be connected to the printed circuit board during surface mounting.

The case 1 has a first end 3 and a second end 4. The first end 3 of the case 1 is open. The wires which form the terminals 2a, 2b of the winding element protrude out of the first end 3 of the case 1. The second end 4 of the case 1 is arranged opposite of the first end 3. The second end 4 is closed. The first end 3 is also referred to as a lower end and the second end 4 is also referred to as an upper end in this document.

The capacitor further comprises a sealing element 5 which is configured to seal the case 1. In particular, the sealing element 5 is configured to seal the lower end 3 of the case 1. The sealing element 5 comprises a non-conductive material, for example rubber. Rubber is particularly suitable as a material of the sealing element 5 as rubber has a high elasticity and, therefore, can reliably close the case 1. The sealing element 5 comprises two holes 6 configured to receive the terminals 2a, 2b of the winding element. The sealing element 5 is inserted into the case 1 from the lower end 3 of the case 1.

The capacitor comprises the metal element 7 which is arranged below the sealing element 5 in a direction pointing away from the winding element. The metal element 7 has a ring-shaped base body 8 and comprises two protruding parts 9a, 9b.

Figure 4:
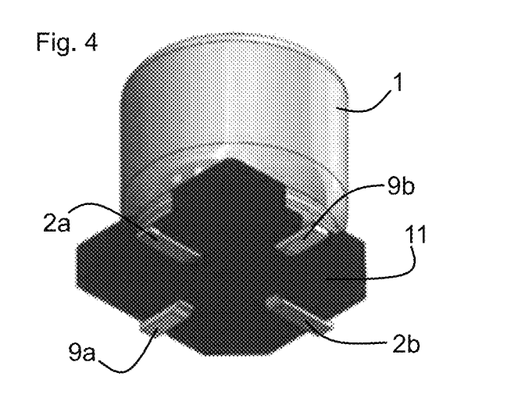
FIG. 4 shows the capacitor according to the first embodiment after the assembly process is completed.
Figure 5:
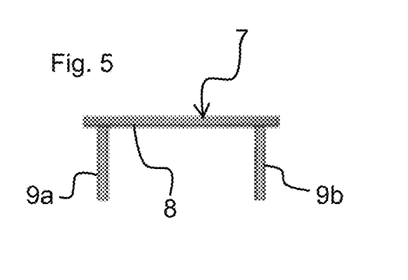
FIGS. 5, 6 and 7 show a metal element according to a first embodiment before bending of a protruding part.
Figure 6:
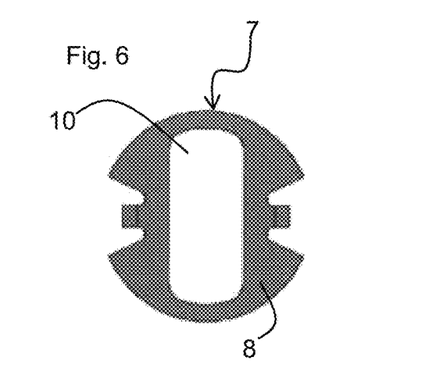
Figure 7:
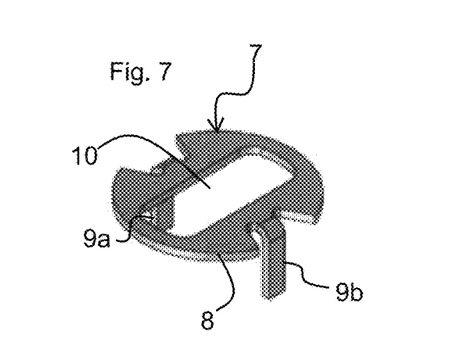

Further details of the metal element 7 are shown in each of FIGS. 4, 5 and 6 which show perspective views of the metal element 7 before the protruding parts 9a, 9b of the metal element 7 are bent. Thus, each of FIGS. 4 to 6 shows the metal element 7 before the assembly process is completed.

The ring-shaped base body 8 of the metal element 7 comprises an opening 10. When the metal element 8 is assembled to the capacitor, the terminals 2a, 2b of the winding element pass through the opening 10 in the base body 8. The opening 10 is larger than the distance between the terminals 2a, 2b. Thus, the metal element 7 can be combined with a large variety of winding elements and sealing elements wherein the position of the terminals 2a, 2b can be varied.

The metal element 7 comprises two protruding parts 9a, 9b. Both protruding parts 9a, 9b protrude in the same direction, i.e. in a direction away from the winding element. Each of the protruding parts 9a, 9b is a pin. The length of the pins is chosen such that the protruding parts 9a, 9b protrude through a mounting plate 11 which will be described later with respect to FIG. 3. The length of the protruding parts 9a, 9b is chosen such that a part of the protruding parts 9a, 9b which protrudes through the mounting plate 11 can be bent and can form a contact for surface mounting.

The sealing element 5 comprises a protrusion 20 which protrudes in a direction away from the winding element and towards to metal element 7. The shape of the protrusion 20 is adapted to the shape of the opening 10 in the ring-shape base body 8 of the metal element. The metal element 7 is configured to be attached to the sealing element 5. When the metal element 7 is attached to the sealing element 5, the protrusion 20 is inserted into the opening 10. The protrusion 20 stabilizes the mechanical connection of the metal element 7 to the sealing element 5 before the mounting plate n is assembled and before the protruding parts 9a, 9b of the metal element 7 are bent.

Figure 2:
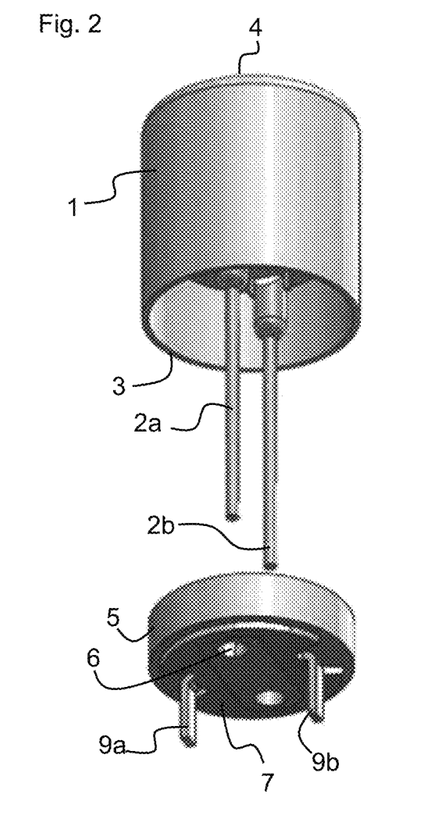
FIGS. 2 and 3 show perspective views of a capacitor according to a first embodiment during different stages of an assembly process.
Figure 3:
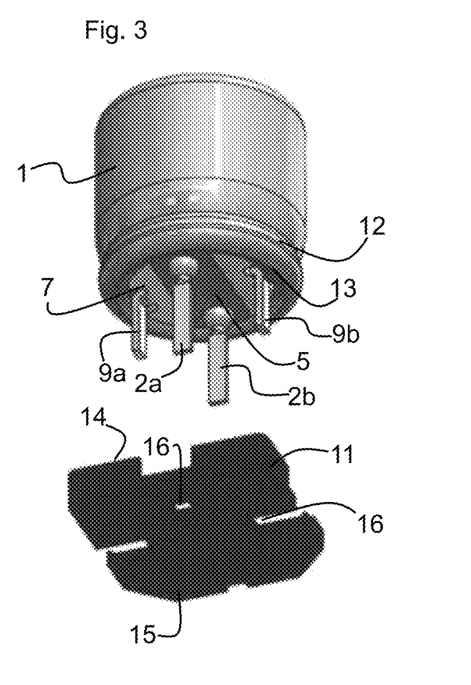

FIGS. 2 and 3 show a capacitor according to a first embodiment during an assembly process. FIG. 4 shows the capacitor according to the first embodiment after the assembly is completed.

The capacitor is designed to be fixed to a printed circuit board (PCB) in a surface mounting process. The capacitor is mechanically and galvanic connected to the PCB when surface mounted to the PCB.

In FIG. 2, which shows a first stage of the assembly process, the terminals 2a, 2b are wires which have a circular cross-section. The metal element 7 has been put onto the sealing element 5 and is held on the sealing element 5 by the protrusion 20.

FIG. 3 shows the capacitor in a second stage of the assembly process. The sealing element 5 and the metal element 7 have been arranged at the lower end of the case 1. A crimp 12 and a curling 13 have been added to the lower end of the case 1. By adding the crimp 12 and the curling 13, the sealing element 5 is positioned in the case 1 and fixed to the case 1 such that the case 1 is sealed by the sealing element 5. The crimp 12 and the curling 13 provide a mechanical fixation which prevents a movement of the sealing element 5 relative to the case 1. The crimp 12 and the curling 13 also mechanically fix the metal element 7. No additional elements or means are required for fixing the metal element 7 to the case 1. Instead, the same fixation means used to fix the sealing element 5, i.e. the crimp 12 and the curling 13, also enable fixing the metal element 7 to the case 1.

The terminals 2a, 2b of the winding element have been pressed and cut such that they form contact pins. The contact pins of the winding element formed by terminals 2a, 2b are connected by a first virtual line which is perpendicular to a second virtual line connecting the protruding parts 9a, 9b of the metal element 7.

The capacitor further comprises the above-mentioned mounting plate 11 shown in FIG. 3. The mounting plate 11 is configured to be fixed to the lower end of the capacitor.

The mounting plate 11 has a first surface 14 facing towards the case. The mounting plate 11 has a second surface 15 facing away from the case 1. The second surface 15 of the mounting plate 11 is a mounting surface of the capacitor which abuts the PCB when the capacitor is surface mounted.

The mounting plate 11 comprises four openings 16 configured to receive the two protruding parts 9a, 9b of the metal element 7 and the two terminals 2a, 2b of the winding element. The mounting plate 11 comprises a non-conductive material. The mounting plate 11 has a thickness which is smaller than the length of the protruding parts 9a, 9b of the metal element 7 and of smaller than the length of the terminals 2a, 2b of the winding element.

FIG. 4 shows the capacitor after the assembly process is completed. The protruding parts 9a, 9b of the metal element 7 have been passed through the openings 16 in the mounting plate 11 and, afterwards, the protruding parts 9a, 9b have been bent.

Figure 8:
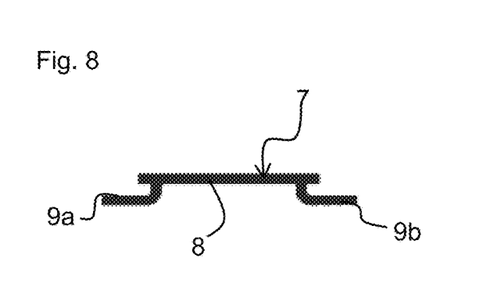
FIGS. 8, 9 and 10 show a metal element according to the first embodiment after bending of the protruding part.
Figure 9:
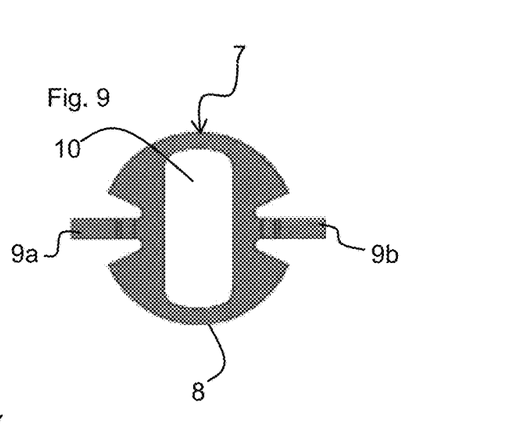
Figure 10:
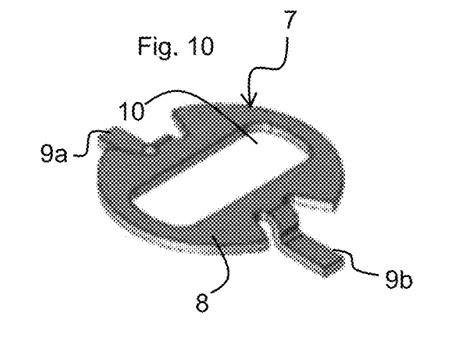

Each of FIGS. 8, 9 and 10 shows the metal element 7 after bending of the pins.

The capacitor comprises four mechanical contacts at its mounting surface which can be fixed to the printed circuit board by surface mounting. Two of the contacts are formed by the terminals 2a, 2b of the winding element. These contacts are configured to provide a mechanical fixation and an electrical contact of the winding element to the printed circuit board. Further, two contacts are formed by the protruding parts 9a, 9b of the metal element 7. These two contacts are configured to provide a mechanical fixation of the capacitor to the printed circuit board after surface mounting. The protruding parts 9a, 9b of the metal element 7 do not provide an electrical connection to the winding element. The four contacts are arranged such that they form four arms of a cross wherein the contacts do not touch each other.

Each of the contacts also provides a thermal connection. In particular, the metal element 7 is thermally connected to the case 1. Thus, during surface mounting, for example by reflow soldering, the metal element 7 contributes to accelerate the heat transfer to solder pads of the printed circuit board.

Surface mounting can, for example, be performed in a reflow soldering process. The capacitor can be arranged on the printed circuit board wherein each of the four contacts is arranged on a solder pad. The capacitor on the PCB is moved into an oven and heated. In order to accelerate the heating process, it is crucial to apply the heat to the solder pads fast.

Heat which is collected by the case 1 during reflow soldering, can be directly transferred to the solder pads by the metal element 7 which is thermally connected to the case 1. Thus, the solder pads are not only heated via heat applied to the printed circuit board but also via heat which is collected from the case 1 and transferred to the solder pads via the metal element 7. Thus, the metal element 7 enables an acceleration of the surface mounting of the capacitor to the PCB.

During normal operation of the capacitor, heat can also be transferred from the case 1 via the metal element 7 to the printed circuit board. Thus, the metal element 7 allows to use the PCB as a heatsink. Ripple currents applied to the capacitor during normal operation can generate heat and this heat is generally transferred from the winding element to the case 1. As the case 1 is thermally connected to the PCB via the metal element 7, the PCB can be used as a heatsink.

As discussed above, the metal element 7 is mechanically fixed to the case 1. No glue or external plastic parts are required for fixing the metal element 7. A purely mechanical fixation of the metal element 7 does not suffer from aging due to temperature changes or humidity, in contrast to glue and external plastic parts which are sensitive to temperature changes and humidity and which generally suffer from aging. The mechanical fixation of the metal element 7 is stable within a wide temperature range and within a wide humidity range.

Figure 11:
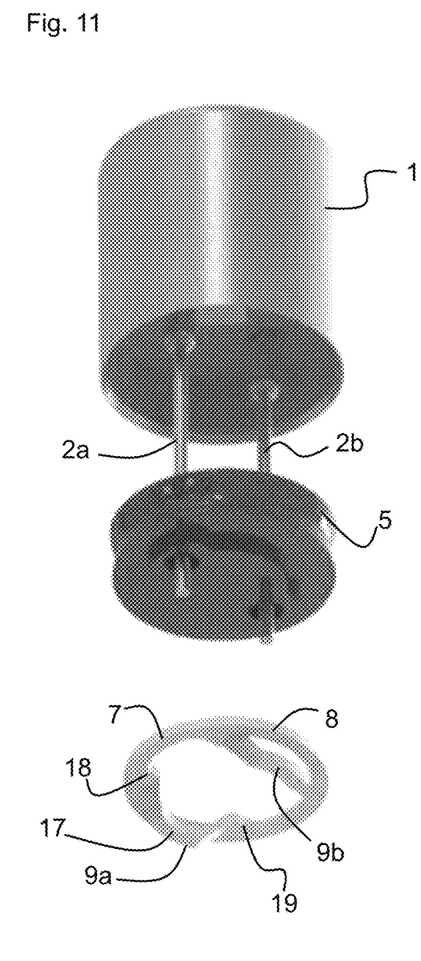
FIGS. 11 and 12 show a capacitor according to a second embodiment during different stages of an assembly process.
Figure 12:
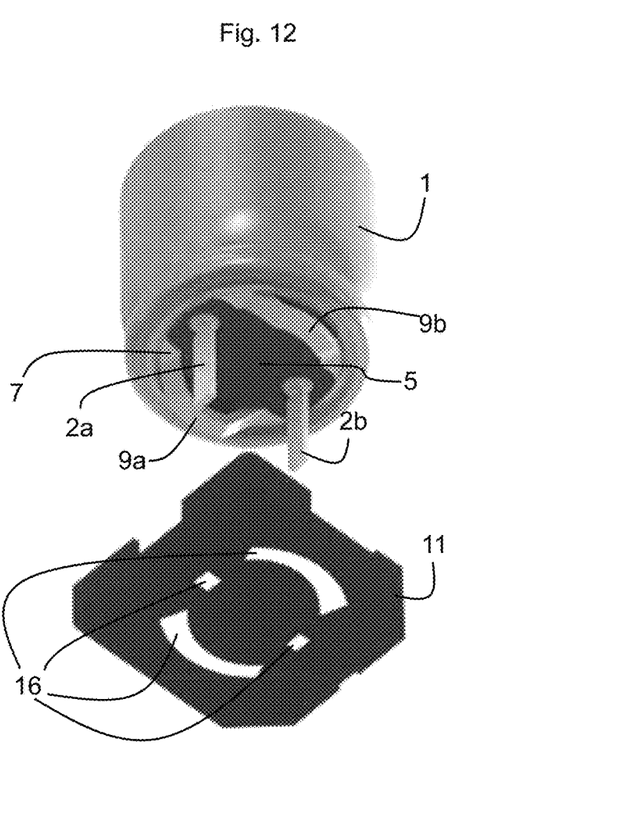
Figure 13:
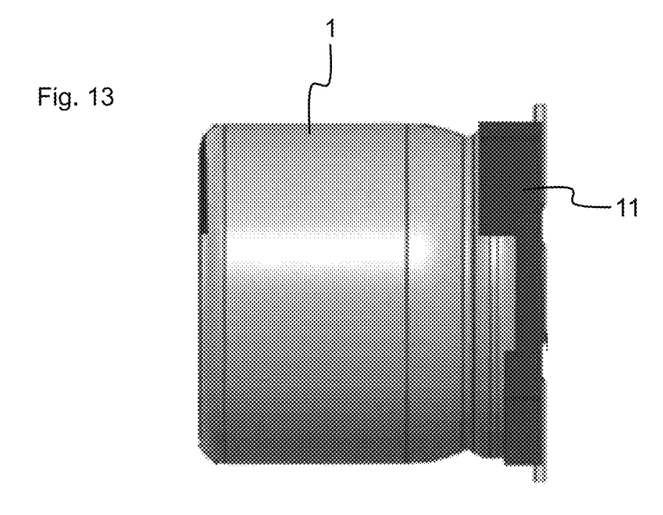
FIGS. 13 and 14 show the capacitor of the second embodiment after the assembly process is completed.
Figure 14:
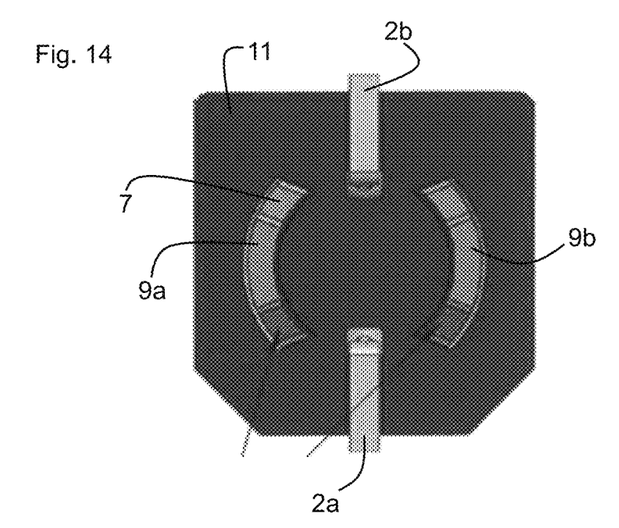

FIGS. 11 and 12 show a capacitor according to a second embodiment during different stages of the assembly process. FIGS. 13 and 14 show the capacitor after the assembly process is finalized.

The second embodiment differs from the first embodiment in the design of the metal element 7. According to the second embodiment, the metal element 7 is formed by a stamped metal sheet which also has a ring-shaped base body 8. Further, the protruding parts 9a, 9b of the metal element 7 are not formed by pins but by a metal stripe which projects in its middle part 17 towards the mounting surface. A first end 18 and a second end 19 of the stripe are connected to the ring-shaped base body. The first end 18 and the second end 19 of the stripe are connected by the middle part 17. The middle part 17 of the protruding elements 9a, 9b is u-shaped.

FIG. 11 shows the capacitor of the second embodiment at a first stage of the assembly process similar to FIG. 2. The metal element 7 is arranged below the sealing element 5 of the case 1.

FIG. 12 shows the capacitor in a second stage of the assembly process similar to FIG. 3. In the second embodiment, the mounting plate 11 is adapted to the shape of the metal element 7 of the second embodiment. The openings 16 in the mounting plate 11 are adapted to the projecting parts 9a, 9b. Thus, the openings in the mounting plate of the second embodiment are formed in a segment of a circle.

It can be seen in FIG. 14 that, according to the second embodiment, there are also four mechanical contacts which can be fixed to a printed surface board by surface mounting. Two of the contacts are formed by the terminals 2a, 2b of the winding element and two additional contacts are formed by the protruding parts 9a, 9b metal element 7 which are preferably not galvanic connected to the winding element, but which provide an improved mechanical and thermal connection between the case 1 and the printed circuit board.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A capacitor comprising:
   a winding element arranged in a case;
   a mounting plate which comprises a non-conductive material and which is fixed to the case; and a metal element arranged between the case and the mounting plate, wherein the metal element comprises a protruding part protruding through the mounting plate, and wherein the metal element is fixed to the case by a crimp and a beading.

2. The capacitor according to claim 1, wherein the protruding part of the metal element is configured to be fixed to a printed circuit board when the capacitor is surface mounted to the printed circuit board.

3. The capacitor according to claim 2, wherein the metal element is configured to transfer heat from the case to the printed circuit board.

4. The capacitor according to claim 2, wherein the winding element comprises two terminals forming two contacts of the capacitor, the two contacts configured to be fixed to the printed circuit board when surface mounted, and wherein the metal element provides two additional mechanical contacts configured to be fixed during the surface mounting.

5. The capacitor according to claim 1, wherein the metal element is thermally connected to the case.

6. The capacitor according to claim 1, wherein the mounting plate comprises an opening, and wherein the protruding part of the metal element protrudes through the opening.

7. The capacitor according to claim 1, wherein the metal element is clamped between the mounting plate and the case.

8. The capacitor according to claim 1, wherein the metal element is purely mechanically fixed to the case.

9. The capacitor according to claim 1, wherein the metal element comprises a ring-shaped base body.

10. The capacitor according to claim 1, wherein the protruding part of the metal element is a pin.

11. The capacitor according to claim 10, wherein the pin is bent such that it forms a surface parallel to a mounting surface of the capacitor.

12. The capacitor according to claim 1, wherein the metal element is a stamped metal sheet and the protruding part is formed by stamping.

13. The capacitor according to claim 1, wherein the metal element is not galvanically connected to the winding element.

14. The capacitor according to claim 1, further comprising a sealing element which seals the case.

15. The capacitor according to claim 14, wherein the metal element is arranged between the sealing element and the mounting plate.

16. An arrangement comprising:

a printed circuit board; and the capacitor according to claim 1, wherein the capacitor is fixed to the printed circuit board by surface mounting.

17. A capacitor comprising:

a winding element arranged in a case;

a mounting plate which comprises a non-conductive material and which is fixed to the case; and a metal element arranged between the case and the mounting plate, wherein the metal element comprises a protruding part protruding through the mounting plate, and wherein the metal element comprises a ring-shaped base body.

18. The capacitor according to claim 17, wherein the protruding part of the metal element is a pin.

19. A capacitor comprising:

a winding element arranged in a case;

a mounting plate which comprises a non-conductive material and which is fixed to the case; and a metal element arranged between the case and the mounting plate, wherein the metal element comprises a protruding part protruding through the mounting plate, wherein the protruding part of the metal element is a pin, and wherein the pin is bent such that it forms a surface parallel to a mounting surface of the capacitor.

20. A capacitor comprising:

a winding element arranged in a case;

a mounting plate which comprises a non-conductive material and which is fixed to the case; and a metal element arranged between the case and the mounting plate, wherein the metal element comprises a protruding part protruding through the mounting plate, and wherein the metal element is a stamped metal sheet and the protruding part is formed by stamping.

\* \* \* \* \*